United States Patent
Rapp

[11] 3,785,834
[45] Jan. 15, 1974

[54] GLASSES, GLASS-CERAMICS AND PROCESS FOR MAKING SAME

[75] Inventor: James Erich Rapp, Oregon, Ohio
[73] Assignee: Owens-Illinois, Inc., Toledo, Ohio
[22] Filed: June 9, 1972
[21] Appl. No.: 261,188

[52] U.S. Cl............... 106/39.6, 65/33, 106/47 Q, 106/47 R, 106/50, 106/52, 106/73.2, 252/62.9, 252/301.6 P, 350/96
[51] Int. Cl........ C04b 3/22, C04b 3/16, C04b 3/12
[58] Field of Search............... 106/47 Q, 47 R, 52, 106/39.6, 39.5, 50, 73.2, 39 DV; 252/62.9, 301.6 P

[56] References Cited
UNITED STATES PATENTS

| | | | |
|---|---|---|---|
| 3,615,757 | 10/1971 | Herczog et al. | 106/52 |
| 3,195,030 | 7/1965 | Herczog et al. | 106/39.6 |
| 3,029,152 | 4/1962 | Milne | 106/52 X |
| 3,460,954 | 8/1969 | Young | 106/52 X |
| 3,423,686 | 1/1969 | Ballman et al. | 252/62.9 X |
| 3,035,896 | 5/1962 | Brixner | 106/73.2 X |
| 2,992,929 | 7/1961 | Clement et al. | 106/73.2 X |
| 3,422,018 | 1/1969 | Belloc | 106/39.5 |
| 3,116,262 | 12/1963 | Goodman | 106/39.5 |
| 3,674,455 | 4/1972 | Dugger | 106/47 Q |
| 3,573,939 | 4/1971 | Beall | 106/52 |

FOREIGN PATENTS OR APPLICATIONS

| | | | |
|---|---|---|---|
| 977,835 | 3/1963 | Great Britain | 106/39.5 |

OTHER PUBLICATIONS

Imoaka, M. et al. Report of the Institute Industrial Science, March 1969 (pp. 161–193) 19(3) "Three Component System Glass Formation Range II–α–Group Elements Germanate System".

*Primary Examiner*—Helen M. McCarthy
*Attorney*—E. J. Holler et al.

[57] ABSTRACT

Thermally crystallizable glasses of the $R_2O$-$RE_2O_3$-$Nb_2O_5$-GF system wherein R is an alkali metal cation, RE is a rare earth metal cation, and GF is a glass former, namely, $SiO_2$, $GeO_2$ or $P_2O_5$, and transparent, translucent and opaque glass-ceramics made therefrom which have excellent dielectric properties, have high indices of refraction when the glass-ceramic is transparent and are suitable for use as capacitors and dielectrics, and for use in acoustooptical and electrooptical devices and the like. Also thermally crystallizable glasses of the $R^1O$-$RE_2O_3$-$Nb_2O_5$-$GeO_2$ system wherein $R^1$ is a divalent metal cation and RE is a rare earth metal cation and such glasses have high indices of refraction usually above 2.00, and very low acoustic attenuation. These properties make the glasses and also the transparent glass-ceramics made therefrom ideally suited for use in acoustooptical and electrooptical devices wherein such properties are important to the efficient operation of such devices. Transparent and opaque glass-ceramics made from such glasses also have good dielectric properties including high dielectric constants and low dissipation factors. Glass-ceramics of the invention preferably have crystalline phases exhibiting the cubic perovskite structure or the tetragonal tungsten-bronze structure.

38 Claims, No Drawings

GLASSES, GLASS-CERAMICS AND PROCESS FOR MAKING SAME

The advent of acoustooptical devices, electrooptical devices, and other devices utilizing transparent glasses and glass-ceramics has created a need for glasses and glass-ceramics having high indices of refraction and good light transmission properties. It is well-known, however, that the higher the index of refraction of a glass, the more difficult it is to obtain it in optical quality, i.e., free from bubbles, cords, stones, etc. This is especially true when the index of refraction is about 1.80 or higher.

While single crystal materials are of high quality and can be used in acoustooptical and electrooptical devices, they are relatively expensive to obtain, especially in large sizes and, moreover, one is limited to the precise index of refraction or dielectric constant and dissipation factor inherent in any particular single crystal.

The present invention is directed to certain compositions coming within the $R_2O$-$RE_2O_3$-$Nb_2O_5$-GF and $R^1O$-$RE_2O_3$-$Nb_2O_5$-$GeO_2$ system wherein R is an alkali metal cation selected from $Na^{+1}$, $K^{+1}$, $Li^{+1}$, $Rb^{+1}$, $Cs^{+1}$; $R^1$ is a divalent metal cation selected from $Pb^{+2}$, $Ba^{+2}$ and $Sr^{+2}$; RE is a trivalent metal cation of the rare earths of the group $La^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$ and includes other trivalent cations, such as $Sc^{+3}$, $Y^{+3}$, $In^{+3}$, $Bi^{+3}$ and the like. Wherever the term "rare earth" is used henceforth in this specification and claims, it is intended to include the trivalent cations listed above.

In the first system mentioned in the previous paragraph, in some instances $R_2O$ can be replaced in part by $R^1O$ and in such event it must be kept in mind that the substitution is made in such a manner that one such divalent ion is used in lieu of two monovalent R ions to maintain the charge balance. The Glass Former is either $GeO_2$, $SiO_2$ or $P_2O_5$ but should not be a mixture of two or more of these since a mixture of these glass formers tends to separate into two glass phases during the melting. In a specially preferred embodiment of the invention, the compositions of the systems named have the formulas $R_2RENb_5O_{15} \cdot xGF$ and $R^1RENb_5O_{15} \cdot xGeO_2$ where $x$ is a number from 1 to 3 in an amount varying according to the particular R or $R^1$ ion and the rare earth ion used. In such preferred compositions there is obtained a solid solution of alkali metal niobate or divalent metal niobate with the rare earth niobate to provide the desired cubic perovskite or tetragonal tungsten-bronze crystal structure in the glass-ceramic resulting from the heat treatment of the glass. The Glass Former should be present only in an amount sufficient to produce the glass of the desired composition having high dielectric constants and high indices of refraction which, when crystallized, will produce the necessary crystal structure sufficient to give the desired index of refraction and/or dielectric properties, and/or acoustooptical or electrooptical properties which properties are often improved in the glass-ceramics. Preferred crystal structures are the cubic perovskite and the tetragonal tungsten-bronze structures.

Glass ceramics of the present invention can be formed from the crystallizable glasses even though the glasses do not have any of the customary nucleating agents, such as $TiO_2$, $ZrO_2$ or the like. Glasses and transparent glass ceramics of this invention are suitable for use in electrooptical devices, acoustooptical devices and the like, including, for example, modulators, wave guides, laser Q-switches and/or deflectors, and the like. Certain of the glasses and glass ceramics have been found to also have good dielectric properties including high dielectric constants and low dissipation factors which make them suitable for use in a variety of electrical devices, such as capacitors, electroluminescent cells, and the like. Dielectric constants of at least about 50 (at room temperature and 0.5 MHz) with loss tangents or dissipation factors of less than 3 percent and preferably less than 1 percent are obtained with glass-ceramics of the present invention. The glass-ceramics of this invention can also be prepared in the form of small chips, of a size of about ¼ inch and less, which are suitable as chip capacitors or can be ground into powder useful for screen printing of capacitors in electronic microcircuits.

The presence of the rare earth elements in the glasses and glass-ceramics imparts to these products the ability to fluoresce, i.e., when subjected to a source of appropriate radiation, they absorb this energy and emit light during irradiation and for a time thereafter, which time is usually measured in micro-seconds. This fluorescent property makes these glasses and glass-ceramics a valuable tool in the field of computer panels on which data is projected and viewed.

Furthermore, the formation of cubic perovskite crystals in certain of the transparent glass ceramics makes them potentially useful as laser materials. The presence of rare earth ions in the ordered structure of the crystal provides sharper absorption and emission bands for the fluorescing phenomena, making the glass-ceramics ideally suited as lasers.

Included within the broad spectrum of the alkali metal oxide-rare earth oxide-$Nb_2O_5$ - Glass Former system of the invention, are the following compositions of the invention consisting essentially of the following oxides in the indicated mole percent ranges:

| Ingredient | Mole Percent |
|---|---|
| $SiO_2$ | 20–45 |
| $Nb_2O_5$ | 34–50 |
| Rare Earth Oxide ($RE_2O_3$) | 7–10 |
| $R_2O$ | 14–20 | wherein $R_2O$ is an alkali metal oxide and preferably is a member selected from the group consisting of $Na_2O$, $K_2O$, $Rb_2O$, $Cs_2O$ or mixtures thereof.

In a preferred embodiment of the compositions just defined, the compositions have the formula $R_2RENb_5O_{15} \times SiO_2$ wherein x is a number of from 1 to 3, and glass-ceramics formed therefrom contain crystals which have a cubic perovskite or a tetragonal tungsten-bronze crystal structure.

In the $R_2O$-$RE_2O_3$-$Nb_2O_5$-$SiO_2$ system, the most preferred compositions consist essentially of the following ingredients in the indicated mole percents:

| Ingredient | Mole Percent |
|---|---|
| $SiO_2$ | 32–40 |
| $Nb_2O_5$ | 37–43 |
| $RE_2O_3$ | 7.5–8.5 |
| $R_2O$ | 15–17 | wherein $RE_2O_3$ and $R_2O$ are the same as identified above.

The compositions set forth in the following tables were prepared by melting together the glass former, such as $SiO_2$, $GeO_2$ or $P_2O_5$, the $Nb_2O_5$, the rare earth oxide and the alkali metal oxide or the divalent metal oxide in the mole percents given in the respective tables. In some instances the alkali metal oxides and the divalent metal oxides were charged as the respective carbonates.

In preparing the compositions, the raw materials or ingredients were batched and each of the batches was heated to a temperature sufficient to melt the ingredients and then held at that temperature for about 1-24 hours, the time being dependent on the specific composition and how long it took for the melting to be completed and a homogeneous melt to be formed. The melt was periodically stirred during this time. Each molten composition was then poured onto a metal plate and another metal plate placed over it to quench the composition. The glass-forming tendency of each composition was judged on the ability of the melt to be quenched into glass between the metal plates. Some of the melts, and particularly the $R^1O$-containing melts, to be discussed infra, were found to be stable enough to be poured into molds, rather than having to be quenched.

Many of the glasses which were formed were then subjected to temperatures for a period of time sufficient to first nucleate and then crystallize the glass to a transparent, inorganic crystalline oxide ceramic material known as a glass-ceramic. Such a material or glass-ceramic, contains a major portion of very tiny crystals embedded in a minor glassy matrix remaining as a result of the thermal crystallization. Various property measurements of the glasses and glass-ceramics were made and the values are set forth in the following Table. Table I exemplifies glasses and glass-ceramics wherein $SiO_2$ is the Glass Former.

While those in the art can readily prepare the glasses disclosed in Table I, the batch materials and the respective amounts used are given below for representative glasses of Table I.

| Batch Materials | Compositions (parts by weight) | | | | | |
|---|---|---|---|---|---|---|
| | 1 | 6 | 7 | 8 | 9 | 18 |
| Ottawa Silica | 23 | | | | | |
| Quartz | | 27.8 | 27.9 | 27.4 | 29.4 | 28 |
| Soda Ash | 27.3 | | | | | |
| Potassium Carbonate | | 25.8 | 25.8 | 25.3 | 27.2 | |
| Cesium Carbonate | | | | | | 51.4 |
| Niobium Oxide($Nb_2O_5$) | 169.9 | 123.6 | 124 | 121.6 | 130.3 | 103.2 |
| Lanthanum Oxide($La_2O_3$) | 42.1 | | | | | 25.9 |
| Neodymium Oxide($Nd_2O_3$) | | 32 | | | | |
| Praesodymium Oxide($Pr_2O_3$) | | | 30.8 | | | |
| Dysprosium Oxide($Dy_2O_3$) | | | | 34.4 | | |
| Yttrium Oxide($Y_2O_3$) | | | | | 22.4 | |

Table I

| Ingredient | Compositions in Mole Percent | | | | | | | | | |
|---|---|---|---|---|---|---|---|---|---|---|
| | 1 | 2 | 3 | 4 | 5 | 6 | 7 | 8 | 9 | 10 |
| $SiO_2$ | 27.2 | 27.2 | 33.3 | 33.3 | 38.4 | 38.4 | 38.4 | 38.4 | 38.4 | 42.9 |
| $Nb_2O_5$ | 45.5 | 45.5 | 41.7 | 41.7 | 38.5 | 38.5 | 38.5 | 38.5 | 38.5 | 35.7 |
| $Na_2O$ | 18.2 | — | — | — | — | — | — | — | — | — |
| $Cs_2O$ | — | — | — | — | — | — | — | — | — | — |
| $K_2O$ | — | 18.2 | 16.7 | — | 15.4 | 15.4 | 15.4 | 15.4 | 15.4 | 14.3 |
| $Rb_2O$ | — | — | — | 16.7 | — | — | — | — | — | — |
| $La_2O_3$ | 9.1 | 9.1 | 8.3 | 8.3 | 7.7 | — | — | — | — | 7.14 |
| $Nd_2O_3$ | — | — | — | — | — | 7.7 | — | — | — | — |
| $Pr_2O_3$ | — | — | — | — | — | — | 7.7 | — | — | — |
| $Gd_2O_3$ | — | — | — | — | — | — | — | — | — | — |
| $Dy_2O_3$ | — | — | — | — | — | — | — | 7.7 | — | — |
| $Sm_2O_3$ | — | — | — | — | — | — | — | — | — | — |
| $Y_2O_3$ | — | — | — | — | — | — | — | — | 7.7 | — |

| Ingredient | 11 | 12 | 13 | 14 | 15 | 16 | 17 | 18 | 19 | 20 |
|---|---|---|---|---|---|---|---|---|---|---|
| $SiO_2$ | 42.9 | 42.9 | 42.9 | 42.9 | 42.9 | 20 | 33.3 | 42.9 | 38.4 | 33.3 |
| $Nb_2O_5$ | 35.7 | 35.7 | 35.7 | 35.7 | 35.7 | 50 | 41.7 | 35.7 | 38.5 | 41.7 |
| $Na_2O$ | — | — | — | — | — | 20 | 16.7 | — | 15.4 | 8.3 |
| $Cs_2O$ | — | — | — | — | — | — | — | 14.3 | — | — |
| $K_2O$ | 14.3 | 14.3 | — | — | — | — | — | — | — | 8.4 |
| $Rb_2O$ | — | — | 14.3 | 14.3 | 14.3 | — | — | — | — | — |
| $La_2O_3$ | — | — | — | — | — | 10 | 8.3 | 7.1 | 7.7 | 4.2 |
| $Nd_2O_3$ | 7.1 | — | — | 7.1 | — | — | — | — | — | 4.1 |
| $Pr_2O_3$ | — | — | 7.1 | — | — | — | — | — | — | — |
| $Gd_2O_3$ | — | 7.1 | — | — | — | — | — | — | — | — |
| $Dy_2O_3$ | — | — | — | — | — | — | — | — | — | — |
| $Sm_2O_3$ | — | — | — | — | 7.1 | — | — | — | — | — |
| $Y_2O_3$ | — | — | — | — | — | — | — | — | — | — |

TABLE I—Continued

| Ingredient | 1 | 1 | 2* | 3 | 4 | 5 | 6 | 7 | 8 |
|---|---|---|---|---|---|---|---|---|---|
| $x =$ | 1.5 | 1.5 | 1.5 | 2 | 2 | 2.5 | 2.5 | 2.5 | 2.5 |
| nD (Glass) | 2.043 | 2.043 | 2.048 | 1.963 | — | — | 1.934 | 1.919 | 1.914 |
| Dielectric Constant (R.T.,0.5 MHz) | 49.0 | 49.0 | — | — | — | — | 36.6 | — | — |
| Dissipation Factor % (R.T.,0.5 MHz) | 0.6 | 0.6 | — | — | — | — | 0.3 | — | — |
| Transparent Glass Ceramic Heat Treatment Temp. °F(Time,hrs) | 1300(2) 2000(¼) | 1250(2) 1300(¼) | 1550(2) 1600(¼) | 1340(2) 1435(¼) | 1500(2) 1850(¾) | 1375(2) 1600(¼) | 1425(2) 1550(¼) | 1300(2) 1550(¼) | 1300(2) 1350(¼) |
| Color | Yellow | Yellow | Pink | Colorless | Colorless | Colorless | Blue | Green | Yellow |
| nD Transparent Glass Ceramic | — | 2.123 | 2.048 | — | 2.004 | — | 1.979 | 1.968 | 1.972 |
| Dielectric Constant (R.T.,0.5 MHz) | 272 | 142 | 118.4 | — | 58 | — | 106 | 70.8 | 102 |
| Dissipation Factor % (R.T., 0.5 MHz) | 0.4 | 0.5 | 5.5 | — | 0.4 | — | 0.8 | 1.2 | 1.6 |
| Opaque Glass Ceramic Heat Treatment Temp.°F(Time,hrs) | 1375(2) | — | 1675(2) | 1600(2) | 1850(2¾) | — | 1600(2) | 1675(2) | 1425(2) |
| Color | Yellow | — | Pink | Yellow | Grey | — | Blue | Green | White |
| Dielectric Constant (R.T., 0.5 MHz) | 262 | — | 193.1 | 165 | — | — | — | 170 | — |
| Dissipation Factor % (R.T., 0.5 MHz) | 0.6 | — | 0.8 | 0.9 | — | — | — | 0.6 | — |
| Crystal Phases | | | | | | | | | |
| Transparent | — | 1 | — | 5 | — | 3 | 2,3 | — | 4 |
| Opaque | 4 | — | — | 3 | — | — | 2,3 | — | 3 |

*When composition 2 was heated at 1625°F for two hours, a transparent glass-ceramic was formed containing a tetragonal tungsten bronze crystal structure.

| Ingredient | 9 | 10 | 10 | 11 | 12 | 13 | 14 | 15 | 16 |
|---|---|---|---|---|---|---|---|---|---|
| $x =$ | 2.5 | 3 | 3 | 3 | 3 | 3 | 3 | 3 | 1 |
| nD (Glass) | 1.914 | 1.918 | 1.918 | 1.894 | 1.904 | 1.924 | 1.899 | 1.934 | 2.113 |
| Dielectric Constant (R.T., 0.5 MHz) | — | — | — | 34.6 | — | — | — | — | 49.6 |
| Dissipation Factor % (R.T., 0.5 MHz) | — | — | — | 0.3 | — | — | — | — | 0.8 |
| Transparent Glass Ceramic Heat Treatment Temp.°F(Time,hrs) | — | 1375(2) 1700(¼) | 1350(2) 1500(¼) | 1400(2) 1450(¼) | 1400(2) 1600(¼) | 1650(2) 1825(¼) | — | — | 1175(2) 1225(¾) 1250(¼) |
| Color | — | pink | colorless | blue | colorless | yellow-green | — | — | pink |
| nD Transparent Glass Ceramic | — | — | 1.963 | 1.935 | — | — | — | — | — |
| Dielectric Constant (R.T.,0.5 MHz) | — | — | — | 103 | — | — | — | — | — |

TABLE I—Continued

| Ingredient | 9 | 10 | 10 | 11 | 12 | 13 | 14 | 15 | 16 |
|---|---|---|---|---|---|---|---|---|---|
| Dissipation Factor % (R.T., 0.5 MHz) | — | — | — | 0.7 | — | — | — | — | — |
| Opaque Glass Ceramic Heat Treatment Temp.°F(Time,hrs) | — | — | — | 1700(2) | 1650(2) | 1650(2) 1900(¼) | 1900(2) | 1850(2) | — |
| Color | — | — | — | purple | white | green | purple | white | — |
| Dielectric Constant (R.T., 0.5 MHz) | — | — | — | 192 | — | — | — | — | — |
| Dissipation Factor % (R.T., 0.5 MHz) | — | — | — | 1.2 | — | — | — | — | — |
| Crystal Phases |  |  |  |  |  |  |  |  |  |
| Transparent | — | 3 | — | 5 | — | — | — | — | 1 |
| Opaque | — | — | — | 2 | — | — | — | — | — |

| Ingredient | 16 | 17 | 17 | 18 | 19 | 19 | 20 | 20 |
|---|---|---|---|---|---|---|---|---|
| x = | 1 | 2 | 2 | 3 | 2.5 | 2.5 | 2 | 2 |
| nD(Glass) | 2.113 | 2.004 | 2.004 | — | 2.004 | 2.004 | 1.994 | 1.994 |
| Dielectric Constant (R.T., 0.5 MHz) | 49.6 | 36.5 | 36.5 | — | 42.3 | 42.3 | 39.7 | 39.7 |
| Dissipation Factor % (R.T., 0.5 MHz) | 0.8 | 0.8 | 0.8 | — | 0.7 | 0.7 | 0.2 | 0.2 |
| Transparent Glass Ceramic Heat Treatment Temp.°F(Time,hrs) | 1225(16) 1275(¼) | 1350(16) 1400(¼) | 1365(16) — | 1800(2) 1900(¼) | 1600(2) — | 1372(2) 1500(¼) | 1350(2) — | 1275(2) 1300(¼) |
| Color | yellow | yellow | yellow | colorless | yellow | yellow | — | — |
| nD Transparent Glass Ceramic | 2.129 | 2.114 | — | — | 2.114 | — | 2.115 | 2.073 |
| Dielectric Constant (R.T.,0.5 MHz) | 134 | 176 | — | — | 283 | — | 167 | 108 |
| Dissipation Factor % (R.T., 0.5 MHz) | 0.6 | 0.8 | — | — | 1.3 | — | 0.5 | 0.5 |
| Opaque Glass Ceramic Heat Treatment Temp.°F(Time,hrs) | 1250(3) | — | — | 2000(2) | — | — | 1500(2) | — |
| Color | yellow | — | — | white | — | — | — | — |
| Dielectric Constant (R.T., 0.5 MHz) | 94.5 | — | — | — | — | — | 232 | — |
| Dissipation Factor % (R.T., 0.5 MHz) | 0.5 | — | — | — | — | — | 1.0 | — |
| Crystal Phases |  |  |  |  |  |  |  |  |
| Transparent | — | — | 1 | — | — | 1 | — | 1,2 |
| Opaque | 1 | — | — | — | — | — | — | — |

The glasses of the invention wherein $SiO_2$ is the glass-former have an index of refraction of at least 1.80 but preferably at least 1.90 and most preferably 2.00 and above. From Table I, it can be seen that the index of refraction of the resulting glasses was quite high, namely about 1.900 and even above 2.000 for many of the glasses. When subjected to a heat treatment which crystallized certain of the glasses to a transparent glass-ceramic, the index of refraction of these ceramics was higher than that of the original glass in almost every instance. Depending upon the heat treatment to which each glass is subjected, the index of refraction can be made to vary, thus making it convenient to produce a transparent glass-ceramic having a specified high index of refraction. Glass-ceramics of the invention have an index of refraction of at least 1.90 and preferably at least 2.00 and most preferably above 2.10.

Glasses of the invention also have a dielectric constant (Room Temperature, 0.5 MHz) of at least 30 and preferably over 40 and have dissipation losses (R.T., 0.5 MHz) of less than 1 percent and preferably of less than 0.5 percent. The glass-ceramics have improved dielectric properties with the transparent glass-ceramics having a dielectric constant in excess of 50 and preferably in excess of 100 and even in excess of 150 up to about 300 or more with a dissipation factor of less than 2 percent and preferably less than about 1 percent. For the opaque glass ceramics, the dielectric constant is in excess of 75 and preferably in excess of 150 and up to 300 or more with dissipation factors of less than 2 percent and preferably less than 1 percent.

As is apparent from Table I, the dielectric constant of the resulting glasses and transparent and opaque glass-ceramics ranges from a low of about 50, actually 34.6 for the glass of Example 11, to over 100 and in some instances to over 200, as in Examples 1, 19 and 20. What is more important, however, and what makes the glass-ceramics particularly valuable in the electronics industry, is their extremely low dissipation factors. In a majority of the Examples, such dissipation factor is below 1 percent, making the glass-ceramics ideally suited for use as chip capacitors and dielectrics. Such glass-ceramics can also be ground to a powder and used to screen print capacitors for microelectronic circuits.

It has also been noted that the dielectric properties of the resulting glass-ceramics can be made to change, depending upon the heat treatment to which the respective glasses are subjected. This characteristic affords those in the art to make dielectrics with specific properties, rather than rely on the inherent property of a $R_2RENb_5O_{15}$ crystal, per se.

The heat treatment for individual thermally crystallizable glasses of the invention will vary as to the temperature and the times at which they are held at each temperature. The temperature, of course, must be high enough to initiate and maintain the crystallization process in a controlled manner to obtain the desired glass-ceramic, whether it be transparent or opaque, within a reasonable time. It is known, for example, that certain glasses can be thermally in situ crystallized by keeping the glass heated at a low temperature, but at least above the annealing temperature, for a period of time, of days or weeks, until crystallization is complete. It is also known in the art that by subjecting a thermally crystallizable glass to higher temperatures, nucleation and eventually crystallization will occur in a much shorter period of time, sometimes in a matter of a few hours or even a few minutes.

The temperatures and times set forth in Table I are merely representative of those which may be successfully utilized in making the glass-ceramics of the invention. As shown with the compositions of Examples 1, 10, 16, 17, 19 and 20, different properties are obtained in the glass-ceramics from the different heating schedules to which the precursor glasses are subjected. It is within the skill of those in the art, by routine testing, to subject the glasses to different temperatures and times and measuring the various properties obtained. In this manner one can ascertain particular values for dielectric constants, dissipation factors, indices of refraction, etc.

The glass ceramics of the invention were examined by known X-ray diffraction techniques. The d-spacings of each crystal structure were calculated from the data published by B. A. Scott et al in an article appearing in Material Research Bulletin, Vol. 3, pages 831–842, 1968, and were compared with the X-ray results. The similarity of the observed d-spacings from the X-ray data and the calculated d-spacings from the above published data was used as a positive identification of the crystal phase.

The crystal phase or phases present in the glass-ceramics of the invention are identified by numbers in Table I and the numbers correspond to the following structures:

Nos.:
1 - Cubic perovskite structure
2 - Tetragonal tungsten-bronze structure
3 - Unidentified phase in a tetragonal structure
4 - A structure similar to pseudocubic $NaNbO_3$
5 - Unidentified The same numbers have the same meaning in Tables II and III.

The often preferred cubic perovskite structure was identified in the glass-ceramics of Compositions 1, 16, 17 and 19 and the also preferred tetragonal tungsten-bronze structure was identified in the glass-ceramics of Compositions 2, 6, 11 and 20. When Composition 1 of Table I was heat treated at a temperature of 1,000°F for 2 hours and 1,300°F for ¼ hour, the crystal phase was ascertained to be the cubic perovskite structure. However, other glass-ceramics, where these two particular crystal structures were not observed, still had excellent indices of refraction and/or excellent dielectric properties.

The glasses and glass-ceramics of the invention have certain colors imparted thereto and, in some instances, the colors for the glass-ceramics are different from those of the glasses from which the glass-ceramics were made. Thus, the glasses and glass-ceramics are also useful as stones for costume jewelry, furniture inlays, and the like.

A number of compositions of the invention were also prepared in substantially the same manner as those in Table I except that $GeO_2$ was used in lieu of $SiO_2$ as the glass former. The ingredients used to prepare the glasses were either the metal oxides set forth in Table II in the molar proportions disclosed therein, or batch materials similar to those used in making the compositions of Table I, except that germania was used in lieu of the silica or quartz. Again, the alkali metal oxides were charged as alkali metal carbonates into the batches.

The glasses and glass-ceramics of the invention coming within the $R_2O\text{-}RE_2O_3\text{-}Nb_2O_5\text{-}GeO_2$ system, consist essentially of the following ingredients in the indicated ranges:

| Ingredient | Mole Percent |
|---|---|
| $GeO_2$ | 20–50 |
| $Nb_2O_5$ | 30–50 |
| $RE_2O_3$ | 6–10 |
| $R_2O$ | 12–21 | wherein $RE_2O_3$ is a rare earth oxide as identified above and $R_2O$ is an alkali metal oxide, with the proviso that when $R_2O$ is other than $Li_2O$ ($Na_2O$, $K_2O$, $Rb_2O$, $Cs_2O$ and mixtures thereof), the compositions consist essentially of the ingredients set forth in the following ranges:

| Ingredient | Mole Percent |
|---|---|
| $GeO_2$ | 20-45 |
| $Nb_2O_5$ | 34-50 |
| $RE_2O_3$ | 7-10 |
| $R_2O$ | 14-20 |

In a preferred embodiment of the compositions just defined, the compositions have the formula $R_2RENb_5O_{15}$ $xGeO_2$ wherein $x$ is a number from 1 to 4, usually 1 to 3, and glass-ceramics formed therefrom contain crystals having a cubic perovskite or a tetragonal tungsten-bronze crystal structure.

In the most preferred embodiment of compositions of the $R_2O$-$RE_2O_3$-$Nb_2O_5$-$GeO_2$ system, the compositions consist essentially of the following ingredients in the indicated mole percent.

| Ingredient | Mole Percent |
|---|---|
| $GeO_2$ | 32-40 |
| $Nb_2O_5$ | 37-42 |
| $RE_2O_3$ | 7.5-8.5 |
| $R_2O$ | 15-17 | wherein the $RE_2O_3$ and the $R_2O$ are the same as defined above and the $R_2O$ includes $Li_2O$, $Na_2O$, $K_2O$, $Rb_2O$ and $Cs_2O$.

Glasses and transparent glass-ceramics of the invention defined above and illustrated by representative examples in Table II have an index of refraction of at least about 1.95 and preferably over 2 and even over 2.1. Dielectric constants of the transparent glass-ceramics are at least 35 and preferably over 50 and can be as high as 50 and up to 150 or more while the dielectric constants for the opaque glass-ceramics are at least 50 but more preferably over 150 and can go as high as 300 or more. The dissipation factors are as low as 2 percent and preferably as low as 1 percent and less. The opaque glass ceramics in particular have excellent dielectric properties including very low dissipation factors, as seen from Table II. Because of the high indices of refraction of the glasses, they are excellent for use in devices whrein such optical properties are required.

Furthermore, for some unexpected reasons not fully understood, glasses formed with $GeO_2$ as the glass former were much more stable than the glasses of Table I, which had $SiO_2$ as the glass former. One would expect that the $SiO_2$ containing glasses would be more stable, but such was not the case with the compositions of Table II.

As also shown in Table II, glass-ceramics having a cubic perovskite crystal structure or a tetragonal tungsten bronze crystal structure can be obtained, as in

TABLE II

| Ingredient | 21* | 22 | 23 | 24 | 25 | 26 | 27 | 28 | 29 |
|---|---|---|---|---|---|---|---|---|---|
| $GeO_2$ | 27.2 | 33.3 | 42.9 | 42.9 | 33.3 | 42.9 | 42.9 | 47.5 | 42.9 |
| $Nb_2O_5$ | 45.5 | 41.7 | 35.7 | 35.7 | 41.7 | 35.7 | 35.7 | 32.8 | 35.7 |
| $Na_2O$ | 18.2 | — | 14.3 | — | — | — | 14.3 | — | — |
| $K_2O$ | — | — | — | — | 16.7 | — | — | — | — |
| $Rb_2O$ | — | — | — | — | — | — | — | — | — |
| $Li_2O$ | — | 16.7 | — | 14.3 | — | 14.3 | — | 12.7 | 14.3 |
| $La_2O_3$ | 9.1 | 8.3 | 7.1 | — | — | 7.1 | 3.6 | 6.9 | 3.6 |
| $Nd_2O_3$ | — | — | — | — | 8.3 | — | — | — | — |
| $Bi_2O_3$ | — | — | — | 7.1 | — | — | 3.5 | — | 3.5 |
| $x =$ | 1.5 | 2 | 3 | 3 | 2 | 3 | 3 | — | 3 |
| $nD$ (Glass) | 2.115 | 2.112 | 2.022 | 2.115 | 2.000 | 2.048 | 2.043 | 2.029 | 2.114 |
| Transparent Glass-Ceramic Heat Treatment Temp.°F(Time, hours) | 1260(2) | — | 1050(16) 1200(¼) | 1050(3) 1150(¼) | 1200(2½) 1300(¼) | 1025(16) 1150(1) 1175(¼) | — | — | 1050(3) 1150(¼) |
| Color nD | Yellow | — | Colorless | — | Blue | Colorless | — | — | Yellow |
| Transparent Glass-Ceramic | — | — | — | — | — | — | — | — | 2.115 |
| Dielectric Constant (R.T.,0.5 MHz) | — | — | 38 | 53 | 83.9 | 58.3 | — | — | 54.9 |
| Dissipation Factor % (R.T., 0.5 MHz) | — | — | 0.6 | 0.5 | 0.9 | 1.0 | — | — | 1.5 |
| Opaque Glass Ceramic Heat Treatment Temp. °F(Time, Hours) | 1550(2) | — | 1375(16) | — | 1650(2) | 1450(16) | — | 1300(2) | 1375(3) |
| Color | Yellow | — | White | — | Grey | White | — | White | Grey |
| Dielectric Constant (R.T.,0.5 MHz) | 283 | — | 151 | — | 175 | 60.5 | — | — | — |
| Dissipation Factor, % (R.T., 0.5 MHz) | 0.5 | — | 0.4 | — | 0.7 | 0.7 | — | — | — |
| Crystal Phases | | | | | | | | | |
| Transparent | 1 | — | — | — | 2 | — | — | — | — |
| Opaque | — | — | — | — | 3 | — | — | — | — |

*When composition 21 was heated at 1475°F for two hours, an opaque glass-ceramic was formed containing a crystalline phase exhibiting the cubic perovskite structure.

Compositions 21 and 25 respectively.

More importantly, it has been discovered that glasses coming within the present embodiment of the invention are extremely useful in acoustoptical devices since, in addition to the very high indices of refraction, they also have very low acoustic attenuation properties, lower than other known high index glasses. These acoustical properties are set forth in Table V, infra, with respect to Compositions 26 and 28 of Table II, and also with respect to Compositions 63 and 64 infra, which come within the scope of the present embodiment of the invention.

A number of compositions of the invention were prepared substantially in the same manner as those of Tables I and II, except that $P_2O_5$ was used as the glass former in lieu of $SiO_2$ or $GeO_2$. The ingredients used to prepare the glasses were either the metal oxides set forth in Table II in the molar proportions disclosed therein, or, in the case of the alkali metal oxides, they were charged in the batch as alkali metal carbonates.

While those in the art can readily prepare the glasses disclosed in Table III, the batch materials and the respective amounts used are given below for representative glasses of Table III.

ents in the indicated mole percents:

| Ingredient | Mole Percent |
|---|---|
| $P_2O_5$ | 20–40 |
| $Nb_2O_5$ | 38–50 |
| $RE_2O_3$ | 7–10 |
| $R_2O$ | 15–20 | wherein $RE_2O_3$ is a rare earth metal oxide as defined previously and $R_2O$ is an alkali metal oxide, and preferably is $Na_2O$, $K_2O$, $Rb_2O$ and $Cs_2O$ or mixtures thereof.

In a preferred embodiment of the compositions just defined, the compositions have the formula $R_2RENb_5O_{15} \cdot xP_2O_5$ wherein $x$ is a number of from 1 to 2.5, and glass-ceramics formed therefrom have a cubic perovskite or a tetragonal tungsten bronze crystal structure.

However, the most preferred compositions consist essentially of the following ingredients in the indicated mole percent ranges:

| Ingredient | Mole Percent |
|---|---|
| $P_2O_5$ | 27–34 |
| $Nb_2O_5$ | 41–46 |
| $RE_2O_3$ | 8–9.5 |
| $R_2O$ | 16–18.5 |

| Batch Materials | Compositions (parts by weight) | | | |
|---|---|---|---|---|
| | 30 | 31 | 32 | 33 |
| Potassium Phosphate | — | 50.4 | 45.8 | 44.7 |
| Sodium Phosphate | 50.1 | — | — | — |
| Ammonium Phosphate | 20.7 | — | 36.7 | 34.3 |
| Niobium Oxide ($Nb_2O_5$) | 120.8 | 124.6 | 109.4 | 109.4 |
| Potassium Carbonate | — | 0.9 | — | — |
| Neodynium Oxide ($Nd_2O_3$) | — | 31.5 | — | — |
| Lanthanum Oxide ($La_2O_3$) | 30 | — | — | — |
| Samarium Oxide ($Sm_2O_3$) | — | — | 28.6 | — |
| Europium Oxide ($Eu_2O_3$) | — | — | — | 28.8 |

Compositions of the invention wherein $P_2O_5$ is the glass-former consist essentially of the following ingredients wherein $RE_2O_3$ and $R_2O$ are the same as defined above.

TABLE III

| Ingredient | Compositions in Mole Percent | | | | | | | | |
|---|---|---|---|---|---|---|---|---|---|
| | 30 | 31 | 32 | 33 | 34 | 35 | 36 | 37 | 38 |
| $P_2O_5$ | 27.2 | 20 | 33.3 | 33.3 | 33.3 | 33.3 | 27.2 | 33.3 | 33.3 |
| $Nb_2O_5$ | 45.5 | 50 | 41.7 | 41.7 | 41.7 | 41.7 | 45.5 | 41.7 | 41.7 |
| $Na_2O$ | 18.2 | — | — | — | — | — | — | — | — |
| $K_2O$ | — | 20 | 16.7 | 16.7 | 16.7 | 16.7 | — | 16.7 | 16.7 |
| $Rb_2O$ | — | — | — | — | — | — | 18.2 | — | — |
| $La_2O_3$ | 9.1 | — | — | — | — | — | 9.1 | — | — |
| $Nd_2O_3$ | — | 10 | — | — | — | 8.3 | — | — | — |
| $Er_2O_3$ | — | — | — | — | 8.3 | — | — | — | — |
| $Gd_2O_3$ | — | — | — | — | 8.3 | — | — | — | — |
| $Eu_2O_3$ | — | — | — | 8.3 | — | — | — | — | — |
| $Sm_2O_3$ | — | — | 8.33 | — | — | — | — | — | — |
| $Yb_2O_3$ | — | — | — | — | — | — | — | 8.3 | — |
| $Dy_2O_3$ | — | — | — | — | — | — | — | — | 8.3 |
| x = | 1.5 | 1 | 2 | 2 | 2 | 2 | 1.5 | 2 | 2 |
| nD(Glass) | — | — | 1.923 | 1.915 | 1.923 | — | — | 1.929 | 1.938 |
| Transparent Glass Ceramic Heat Treatment Temp. °F(Time,Hrs) | 1375(2) | 1700(2) 1750(2) | 1415(2) 1475(¼) | 1400(2) 1475(¼) | 1360(2) 1500(¼) | 1400(2) 1525(¼) | 1400(2) 1600(¼) | 1435(2) 1500(¼) | 1450(2) 1525(¼) |
| Color | yellow | pink | amber | grey | colorless | pink | blue | colorless | colorless |
| nD Transparent Glass Ceramic | — | 2.121 | — | — | — | — | — | — | — |

TABLE III

| Ingredient | 30 | 31 | 32 | 33 | 34 | 35 | 36 | 37 | 38 |
|---|---|---|---|---|---|---|---|---|---|
| Compositions in Mole Percent | | | | | | | | | |
| Dielectric Constant (R.T.,0.5 MHz) | — | 113 | — | — | 75.8 | 65.8 | — | — | 41.3 |
| Dissipation Factor % (R.T. 0.5 MHz) | — | 0.8 | — | — | 0.5 | 0.5 | — | — | 0.9 |
| Opaque Glass Ceramic Heat Treatment Temp. °F (Time,Hours) | 1550(2) | — | 1500(2) | 1500(2) | 1535(2) | 1475(2) 1500(¼) | 1700(2) | 1525(2) | 1500(2) 1600(¼) |
| Color | grey | — | grey | white | white | pink | blue | white | white |
| Dielectric Constant (R.T., 0.5 MHz) | 86.5 | — | — | — | 126.5 | 100.2 | — | — | 73.2 |
| Dissipation Factor, % R.T. 0.5 MHz | 1.2 | — | — | — | 0.2 | 1.6 | — | — | 0.5 |
| Crystal Phases | | | | | | | | | |
| Transparent | 5 | — | — | — | 1 | 1 | — | — | — |
| Opaque | — | — | — | — | 1,5 | — | — | — | — |

When a glass body of composition 31 was heated at 1,750°F for 2 hours, the transparent glass-ceramic that was formed had a tetragonal tungsten bronze crystal structure. Heating a glass body of composition 35 at 1,500°F for 2 hours and then at 1,525°F for ¼ hour resulted in an opaque glass-ceramic having a crystalline phase exhibiting the cubic perovskite structure. Likewise, when a glass body of composition 38 was heated at 1,350°F for 2 hours and then at 1,500°F for ¼ hour, the transparent glass-ceramic which was formed had an unidentified crystal phase of tetragonal structure. A glass body of the same composition 38, however, heat treated at 1,600°F for 2 hours had a crystalline phase exhibiting the tetragonal tungsten-bronze structure.

Glasses of the invention having $P_2O_5$ as the glass former have an index of refraction of at least 1.85 and preferably of at least 1.90 and above whereas the transparent glass-ceramics made therefrom have even higher indices of refraction, namely, at least 1.90 and preferably at least 2.00.

The index of refraction of the glasses containing $P_2O_5$ is above 1.800. Upon heat treating the glasses to form transparent glass-ceramics, the index of refraction is increased, the amount of the increase depending upon the heat treatment to which the glass is subjected.

Furthermore, transparent glass-ceramics of the invention have dielectric constants of at least 40 and preferably of at least 65 and even over 100 or more with a low dissipation factor of below 1 percent and preferably as low as 0.5 percent or lower. The opaque glass-ceramics of the present invention have a dielectric constant of at least 70 and preferably over 100 and up to 150 or more with a dissipation factor of less than 2 percent and preferably less than 1 percent and, more preferably, less than 0.5 percent. Glass-ceramics of the invention make excellent capacitors and dielectrics.

Some of the glass-ceramics which were examined and tested for crystal structure had the cubic perovskite or the tetragonal tungsten-bronze structure as the crystal phase.

While the foregoing discussion of the invention for the most part relates to the $R_2O$-$RE_2O_3$-$Nb_2O_5$-Glass Former compositions, it has also been found that glasses and glass-ceramics of the $R^1O$-$RE_2O_3$-$Nb_2O_5$-$GeO_2$ system wherein $R^1$ is a divalent metal cation selected from $Sr^{+2}$, $Ba^{+2}$ and $Pb^{+2}$, and mixtures thereof have unexpectedly high indices of refraction for the glasses, together with very good acoustical properties.

While in electrooptical devices the glass or glass-ceramic must be suitably transparent to light and usually has a high index of refraction, because of the presence of highly polarizable ions, in accoustooptical devices the glass or transparent glass-ceramic must also have a low acoustic attenuation in addition to having a high index of refraction. The glasses of this embodiment of the invention have the lowest acoustic attenuation of any high index glasses known to the applicant.

Glasses of this embodiment of the invention consist essentially of the following ingredients expressed in mole percents:

| Ingredient | Mole Percent |
|---|---|
| $GeO_2$ | 30–47 |
| $Nb_2O_5$ | 32–43 |
| $RE_2O_3$ | 6.5–8.5 |
| $R^1O$ | 13–22 | wherein $RE_2O_3$ is a rare earth metal oxide as defined previously, $R^1O$ is a divalent metal oxide selected from PbO, BaO and SrO, and mixtures thereof, and wherein up to about one-half of the moles of $R^1O$ can be replaced by an equal number of moles of $R_2O$. $R_2O$ is an alkali metal oxide such as $Na_2O$, $K_2O$, $Li_2O$, $Rb_2O$, $Cs_2O$ and mixtures thereof.

In a preferred embodiment of the compositions just defined, the compositions have the formula $R^1RENb_5O_{15} \cdot x\,GeO_2$ wherein x is a number of from 1.8 to 3.7.

In the most preferred embodiment of this invention the $RE_2O_3$ is $La_2O_3$ and the now most preferred composition is Composition 42 in Table IV, infra.

While the broad ranges have been set forth above for this embodiment of the invention, excellent results are obtained when the compositions consist essentially of the following ingredients in the expressed mole percent:

A number of representative glass and glass-ceramic compositions were prepared and their identity, together with the heat treatment schedules and the respective properties observed with respect to each composition are set forth in Tables IV, V and VI.

Again, each of the compositions were prepared in the same manner as the compositions of Table II wherein each of the ingredients were mixed together and melted, the ingredients being present in the batches either as the respective oxides in the mole percents set forth in Table IV, or, in the case of BaO, SrO and alkali metal oxides, they were charged into the batches as barium carbonate, strontium carbonate and alkali metal carbonates, respectively.

TABLE IV

| Ingredient | Compositions in Mole Percent | | | | | | | | |
|---|---|---|---|---|---|---|---|---|---|
| | 39 | 40 | 41 | 42 | 43 | 44 | 45 | 46 | 47 |
| $GeO_2$ | 42.9 | 42.9 | 33.3 | 42.9 | 42.9 | 42.9 | 33.3 | 42.9 | 42.9 |
| $Nb_2O_5$ | 35.7 | 35.7 | 41.7 | 35.7 | 35.7 | 35.7 | 41.7 | 35.7 | 35.7 |
| BaO | 7.1 | 14.3 | 16.7 | — | 7.15 | — | — | — | — |
| SrO | — | — | — | — | — | — | 16.7 | — | — |
| PbO | — | — | — | 14.3 | 7.15 | 7.15 | — | 10.5 | 7.15 |
| $La_2O_3$ | 7.1 | 7.1 | 8.3 | 7.1 | 7.1 | 7.1 | 8.3 | 7.1 | 7.1 |
| $Li_2O$ | 7.1 | — | — | — | — | 7.15 | — | 3.8 | — |
| $K_2O$ | — | — | — | — | — | — | — | — | 7.15 |
| $x =$ | 3 | 3 | 2 | 3 | 3 | 3 | 2 | 3 | 3 |
| $nD$ (Glass) | 2.100 | 2.055 | 2.115 | 2.119 | 2.115 | 2.115 | 2.111 | 2.111 | 2.042 |

| Ingredient | 48 | 49 | 50 | 51 | 52 | 53 | 54 | 55 | 56 |
|---|---|---|---|---|---|---|---|---|---|
| $GeO_2$ | 42.9 | 33.3 | 42.9 | 38.4 | 42.9 | 38.4 | 32.4 | 32.4 | 42.9 |
| $Nb_2O_5$ | 35.7 | 41.7 | 35.7 | 38.5 | 35.7 | 38.5 | 40.4 | 40.4 | 35.7 |
| BaO | — | 8.35 | 7.15 | 7.7 | 4.77 | 5.13 | — | — | — |
| SrO | 14.3 | 8.35 | 7.15 | 7.7 | 4.77 | 5.13 | — | 10.3 | — |
| PbO | — | — | — | — | 4.77 | 5.13 | 20.6 | 10.3 | 10.7 |
| $La_2O_3$ | 7.1 | 8.3 | 7.1 | 7.7 | 7.1 | 7.7 | 6.6 | 6.6 | 7.1 |
| $Li_2O$ | — | — | — | — | — | — | — | — | — |
| $K_2O$ | — | — | — | — | — | — | — | — | 3.6 |
| $x =$ | 3 | 2 | 3 | 2.5 | 3 | 2.5 | — | — | 3 |
| $nD$ (Glass) | 2.103 | 2.115 | 2.053 | 2.111 | 2.112 | 2.113 | 2.124 | 2.134 | 2.084 |

| Ingredient | 57 | 58 | 59 | 60 | 61 | 62 |
|---|---|---|---|---|---|---|
| $GeO_2$ | 42.9 | 42.9 | 42.9 | 42.9 | 42.9 | 38.4 |
| $Nb_2O_5$ | 35.7 | 35.7 | 35.7 | 35.7 | 35.7 | 38.5 |
| BaO | — | — | — | — | 7.15 | 7.7 |
| SrO | — | — | — | — | — | — |
| PbO | 9.6 | 8.5 | 8.5 | 7.15 | 7.15 | 7.7 |
| $La_2O_3$ | 7.1 | 7.1 | 7.1 | 7.1 | 7.1 | 7.7 |
| $Li_2O$ | — | — | 5.8 | — | — | — |
| $K_2O$ | 4.7 | 5.8 | — | 7.15 | — | — |
| $x =$ | 3 | 3 | 3 | 3 | 3 | 2.5 |
| $nD$ (Glass) | 2.074 | 2.064 | 2.094 | 2.042 | 2.110 | 2.111 |

| Ingredient | Mole Percent |
|---|---|
| $GeO_2$ | 33–44 |
| $Nb_2O_5$ | 35–42 |
| $RE_2O_3$ | 7–8.5 |
| $R^1O$ | 14–17 | wherein $RE_2O_3$ and $R^1O$ are the same as above and up to about one-half of the moles of $R^1O$ can be replaced by an equal number of moles of $R_2O$. $R_2O$ is also the same as defined above in the broader range of compositions.

More importantly, a representative number of glasses of Table IV and Table II, together with glasses of compositions 63 and 64 were measured not only for the respective index of refraction, which was above 2.00 in each instance, but were also examined and tested for their acoustical properties. The results, showing extremely low acoustic attenuation properties, considering the high indices of refraction, are set forth in Table V.

TABLE V

| Properties | Compositions | | | | | | | | |
|---|---|---|---|---|---|---|---|---|---|
| | 39 | 40 | 42 | 43 | 46 | 47 | 48 | 50 | 51 |
| $A_l$(db/cm) | | | | | | | | | |
| 20 MHz | 1.63 | 1.19 | 1.24 | 1.53 | 1.26 | 1.77 | 2.04 | 1.53 | 2.52 |
| 60 MHz | — | 4.22 | — | 5.46 | — | — | — | 4.20 | — |
| 100 MHz | — | 7.68 | — | — | — | — | — | — | — |
| $A_s$(db/cm) | | | | | | | | | |
| 20 MHz | — | 5.97 | 2.95 | — | 3.28 | 1.82 | 2.24 | — | 3.44 |
| 60 MHz | — | 12.6 | — | — | — | — | — | — | — |
| $V_l$(mm/$\mu$sec.) | 5.326 | 5.132 | 4.939 | 5.049 | 5.091 | 5.021 | 5.393 | 5.369 | 5.233 |
| $V_s$(mm/$\mu$sec.) | — | 2.858 | 2.805 | — | 2.830 | 2.765 | 2.972 | — | 2.936 |

$A_l$ = acoustical attenuation for the longitudinal sound wave, expressed in decibels per centimeter.
$A_s$ = acoustical attenuation for the shear wave, expressed in decibels per centimeter.
$V_l$ = velocity through the glass for the longitudinal wave, expressed in millimeters per micro-second.
$V_s$ = velocity through the glass for the shear wave, expressed in millimeters per micro-second.
MHz = megahertz

| Properties | 53 | 56 | 57 | 58 | 59 | 60 | 61 | 62 |
|---|---|---|---|---|---|---|---|---|
| $A_l$(db/cm) | | | | | | | | |
| 20 MHz | 1.98 | 1.10 | 1.40 | 1.19 | 1.68 | 1.77 | 2.42 | 1.99 |
| 60 MHz | — | — | — | — | — | — | — | — |
| 100 MHz | — | — | — | — | — | — | — | — |
| $A_s$(db/cm) | | | | | | | | |
| 20 MHz | — | 1.68 | 1.85 | 1.99 | 2.17 | 1.82 | 3.60 | — |
| 60 MHz | — | — | — | — | — | — | — | — |
| $V_l$(mm/$\mu$sec.) | 5.147 | 4.964 | 5.061 | 5.044 | 5.294 | 5.021 | 5.236 | 5.280 |
| $V_s$(mm/$\mu$sec.) | — | 2.776 | 2.781 | 2.779 | 2.937 | 2.765 | 2.982 | — |

| Properties | 63 | 64 | 26 | 28 |
|---|---|---|---|---|
| $A_l$(db/cm) | | | | |
| 20 MHz | 1.66 | 1.41 | 2.39 | 1.89 |
| 60 MHz | 4.53 | 4.90 | 4.35 | 8.70 |
| 100 MHz | 9.48 | 6.96 | 9.95 | — |
| $A_s$(db/cm) | | | | |
| 20 MHz | — | — | 3.88 | — |
| 60 MHz | — | — | — | — |
| $V_l$(mm/$\mu$sec.) | 5.402 | 5.246 | 5.589 | 5.522 |
| $V_s$(mm/$\mu$sec.) | — | — | 3.08 | — |

Glasses 63 and 64 of Table V had the following compositions:

| Ingredient | Mole Percent Glasses | |
|---|---|---|
| | 63 | 64 |
| $GeO_2$ | 50 | 42.9 |
| $Nb_2O_5$ | 31.3 | 35.7 |
| $La_2O_3$ | 6.2 | 7.1 |
| $Li_2O$ | 12.5 | 7.1 |
| $K_2O$ | — | 7.2 |
| nD(Glass) | 2.019 | 2.015 |

Besides having surprisingly good acoustical attenuation properties, the glasses of the $R^1O$-$RE_2O_3$-$Nb_2O_5$-$GeO_2$ system of this embodiment of the invention, upon being heat treated, formed glass-ceramics having good dielectric properties including high dielectric constants and low dissipation factors. The transparent glass-ceramics have dielectric constants of greater than 100 and preferably even greater than 200 and up to 300 and more while the dissipation factor is less than 1 percent and preferably less than 0.5 percent. The opaque glass-ceramics have a dielectric constant of over 100 and preferably over 150 and a dissipation factor of less than 3 percent, but preferably less than 1 percent and, more preferably, less than 0.5 percent.

Several of the glasses in Table IV were heat treated to form glass-ceramics and properties of these glass-ceramics were measured and are set forth in Table VI. Again it was noted that the index of refraction of the transparent glass ceramics was higher than that of the corresponding glass. This is shown in the glass-ceramic of composition 42. Likewise, the dielectric constants of the glass ceramics were in excess of 100 and with the composition 42 and 55 glass-ceramic, in excess of 200. Dissipation factors were low in almost every instance, making the glass-ceramics suitable dielectrics for many purposes.

TABLE VI

|  | 39 | 42 | 45 | 49 | 50 | 54 | 55 |
|---|---|---|---|---|---|---|---|
| Transparent Glass Ceramic | | | | | | | |
| Heat Treatment Temp., °F (Time, Hrs.) | — | 1225(2) 1400(¼) | — | — | — | 1200(2) 1300(¼) | 1200(2) 1300(¼) |
| Color | — | yellow | — | — | — | yellow | yellow |
| Transparent nD Glass Ceramic | — | 2.124 | — | — | — | — | — |
| Dielectric Constant (R.T.,0.5 MHz) | — | 224 | — | — | — | 154 | 220 |
| Dissipation Factor % (R.T.,0.5 MHz) | — | 0.4 | — | — | — | 0.5 | 0.4 |
| Opaque Glass Ceramic | | | | | | | |
| Heat Treatment Temp., °F (Time, Hrs.) | 1350(2) | 1500(2) | 1400(2) | 1425(2) 1450(¼) | 1325(2) 1450(¼) | 1500(2) | 1500(2) |
| Color | white | yellow | gray | yellow | white | yellow | yellow |
| Dielectric Constant (R.T.,0.5 MHz) | 159.3 | — | 111 | 165 | 128 | — | — |
| Dissipation Factor,% (R.T.,0.5 MHz) | 2.39 | — | 0.3 | 0.1 | 2.3 | — | — |

|  | 56 | 57 | 58 | 59 |
|---|---|---|---|---|
| Transparent Glass Ceramic | | | | |
| Heat Treatment Temp., °F (Time, Hrs.) | 1175(16) 1350(¼) | 1175(16) 1350(¼) | 1175(16) 1350(¼) | 1150(16) 1250(¼) |
| Color | colorless | colorless | colorless | gray |
| Transparent nD Glass Ceramic | — | — | — | — |
| Dielectric Constant (R.T., 0.5 MHz) | 176 | 166 | 126 | 126 |
| Dissipation Factor % (R.T., 0.5 MHz) | 0.2 | 0.4 | 0.3 | 1.2 |
| Opaque Glass Ceramic | — | — | — | — |
| Heat Treatment Temp., °F (Time, Hrs.) | 1500(2) | 1500(2) | 1500(2) | 1500(2) |
| Dielectric Constant (R.T.,0.5 MHz) | — | — | — | — |
| Dissipation Factor % (R.T.,0.5 MHz) | — | — | — | — |
| Color | white | white | white | white |

Glasses consisting essentially of the following mole percent composition:

| Ingredient | Mole Percent |
|---|---|
| GeO₂ | 30–45 |
| Nb₂O₅ | 32–43 |
| La₂O₃ | 6.5–8.5 |
| PbO | 13–22 | can be thermally crystallized to form transparent glass ceramics having the desirable properties of the invention. Transparent glass ceramics of the foregoing composition range can also be obtained if up to one-half of the PbO is replaced by an equal number of moles of BaO or SrO or both, or if up to two-thirds of the PbO is replaced by an equal number of moles of Li₂O, Na₂O or K₂O or mixtures thereof. Examples of such transparent compositions are examples 42, 54, 55, 56, 57, 58 and 59.

While the glasses and glass-ceramics of the invention have been discussed in terms of the sole essential ingredients, it will be evident to those skilled in the art that minor amounts, preferably not more than 10 percent and most preferably no more than 5 percent by weight of other metal oxides which are compatible with the glass and glass-ceramic compositions can be used. Care should be taken, however, to insure that such other metal oxides do not materially affect the basic characteristics of the glasses and glass-ceramics of the present invention, including the high dielectric constants, low dielectric losses or dissipation factors, high indices of refraction, and low acoustic attenuation.

What is claimed is:

1. A thermally crystallizable glass having an index of refraction of at least 1.80 and being suitable for crystallization to a glass-ceramic having a higher index of refraction of at least 1.90, a dielectric constant of at least 50 (Room temperature, 0.5MHz) and a dissipation factor of less than 2 percent, said glass consisting essentially of the following ingredients in mole percent:

| Ingredient | Mole Percent |
|---|---|
| SiO₂ | 20–45 |
| Nb₂O₅ | 34–50 |
| RE₂O₃ | 7–10 |
| R₂O | 14–20 | wherein RE₂O₃ is a trivalent metal oxide selected from the group consisting of oxides of La, Nd, Sm, Eu, Gd, Tb, Dy, Ho, Er, Tm, Yb, Sc, Y, In and Bi and R₂O is an alkali metal oxide.

2. The thermally crystallizable glass as defined in claim 1 wherein said R₂O is a member selected from the group consisting of Na₂O, K₂O, Rb₂O, Cs₂O and mixtures thereof.

3. A glass-ceramic body having a dielectric constant in excess of 50 (Room temperature, 0.5MHz) and a dissipation factor of less than 2 percent, said glass ceramic prepared by thermally in situ cyrstallizing a thermally crystallizable glass consisting essentially of the following ingredients in mole percent:

| Ingredient | Mole Percent |
|---|---|
| SiO₂ | 20–45 |
| Nb₂O₅ | 34–50 |
| RE₂O₃ | 7–10 |
| R₂O | 14–20 | wherein $RE_2O_3$ is a trivalent metal oxide selected from the group consisting of oxides of La, Nd, Sm, Eu, Gd, Tb, Dy, Ho, ER, Tm, Yb, Sc, Y, In and Bi and $R_2O$ is an alkali metal oxide.

4. The glass-ceramic body as defined in claim 3 wherein said glass-ceramic is transparent and has an index of refraction of at least 1.90.

5. The glass ceramic body as defined in claim 3 wherein said glass-ceramic is transparent and has an index of refraction of at least 2.00.

6. The glass-ceramic body as defined in claim 3 wherein said glass-ceramic body has a dielectric constant in excess of 150 (Room Temperature, 0.5MHz) and a dissipation factor of less than 1 percent.

7. A glass-ceramic body prepared by thermally in situ crystallizing a thermally crystallizable glass of the composition $R_2RENb_5O_{15} \cdot x\ SiO_2$ wherein R is an alkali metal cation, RE is a trivalent metal cation selected from the group consisting of La, Nd, Sm, Eu, Gd, Tb, Dy, Ho, Er, Tm, Yb, Sc, Y, In and Bi and $x$ is a number of from 1 to 3, said glass ceramic body having a crystal structure selected from the group consisting of cubic perovskite crystal structure and tetragonal tungsten-bronze crystal structure.

8. The glass-ceramic body as defined in claim 3 wherein said thermally crystallizable glass consists essentially of the following ingredients in mole percent:

| Ingredient | Mole Percent |
|---|---|
| $SiO_2$ | 32–40 |
| $Nb_2O_5$ | 37–43 |
| $RE_2O_3$ | 7.5–8.5 |
| $R_2O$ | 15–17 |

9. A thermally crystallizable glass having an index of refraction of at least about 1.95 and low acoustic attenuation properties, said glass consisting essentially of the following ingredients in mole percent:

| Ingredient | Mole percent |
|---|---|
| $GeO_2$ | 10–50 |
| $Nb_2O_5$ | 30–50 |
| $RE_2O_3$ | 6–10 |
| $R_2O$ | 12–21 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R_2O$ is an alkali metal oxide, with the proviso that when $R_2O$ is other than $Li_2O$ the glass consists essentially of the following composition:

| Ingredient | Mole percent |
|---|---|
| $GeO_2$ | 20–45 |
| $Nb_2O_5$ | 34–50 |
| $RE_2O_3$ | 7–10 |
| $R_2O$ | 14–20 |

10. A thermally crystallizable glass having an index of refraction of at least about 1.95 and low acoustic attenuation properties, said glass consisting essentially of the following ingredients in mole percent:

| Ingredient | Mole Percent |
|---|---|
| $GeO_2$ | 32–40 |
| $Nb_2O_5$ | 37–42 |
| $RE_2O_3$ | 7.5–8.5 |
| $R_2O$ | 15–17 | and wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R_2O$ is an alkali metal oxide.

11. The thermally crystallizable glass as defined in claim 9 wherein said index of refraction is in excess of 2.00.

12. A glass-ceramic body prepared by thermally in situ crystallizing a thermally crystallizable glass of the composition $R_2RENb_5O_{15} \cdot x\ GeO_2$ wherein R is an alkali metal cation, RE is a trivalent metal cation selected from the group consisting of La, Nd, Sm, Eu, Gd, Tb, Dy, Ho, Er, Tm, Yb, Sc, Y, In and Bi and $x$ is a number of from 1 to 4, said glass-ceramic body containing crystals having a crystal structure selected from the group consisting of cubic perovskite crystal structure and tetragonal tungsten-bronze crystal structure.

13. A glass-ceramic body prepared by thermally in situ crystallizing a thermally crystallizable glass of the composition $R_2RENb_5O_{15} \cdot x\ GeO_2$ wherein R is an alkali metal cation, RE is a trivalent metal cation selected from the group consisting of La, Nd, Sm, Eu, Gd, Tb, Dy, Ho, Er, Tm, Yb, Sc, Y, In and Bi and $x$ is a number of from 1 to 3, said glass-ceramic body containing crystals having a crystal structure selected from the group consisting of cubic perovskite crystal structure and tetragonal tungsten-bronze crystal structure.

14. A glass-ceramic body prepared by thermally crystallizing a thermally crystallizable glass consisting essentially of the following ingredients in mole percent:

| Ingredient | Mole Percent |
|---|---|
| $GeO_2$ | 32–40 |
| $Nb_2O_5$ | 37–42 |
| $RE_2O_3$ | 7.5–8.5 |
| $R_2O$ | 15–17 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R_2O$ is an alkali metal oxide.

15. A glass-ceramic body having a dielectric constant in excess of at least 35 (Room Temperature, 0.5 MHz) and a dissipation factor of less than 2 percent, said glass-ceramic prepared by thermally in situ crystallizing a thermally crystallizable glass defined in claim 9.

16. The glass-ceramic body as defined in claim 15 wherein said glass-ceramic is transparent and has an index of refraction of over 2.00 and a dielectric constant in excess of 50 and a dissipation factor of less than 2 percent.

17. A thermally crystallizable glass having an index of refraction above 1.80 and being suitable for in situ crystallization to a glass-ceramic having a higher index of refraction, a dielectric constant (R.T., 0.5 MHz) of at least 40 and a dissipation factor of less than 2 percent, said glass consisting essentially of the following ingredients in mole percent:

| Ingredient | Mole Percent |
| --- | --- |
| $P_2O_5$ | 20–40 |
| $Nb_2O_5$ | 38–50 |
| $RE_2O_3$ | 7–10 |
| $R_2O$ | 15–20 | wherein $RE_2O_3$ is a trivalent metal oxide selected from the group consisting of oxide of La, Nd, Sm, Eu, Gd, Tb, Dy, Ho, Er, Tm, Yb, Sc, Y, In and Bi and $R_2O$ is an alkali metal oxide or mixtures of alkali metal oxides.

18. The thermally crystallizable glass as defined in claim 17 wherein said $R_2O$ is a member selected from the group consisting of $Na_2O$, $K_2O$, $Rb_2O$, $Cs_2O$ and mixtures thereof.

19. The thermally crystallizable glass as defined in claim 17 wherein said glass consists essentially of the following ingredients in mole percent:

| Ingredient | Mole Percent |
| --- | --- |
| $P_2O_5$ | 27–34 |
| $Nb_2O_5$ | 41–46 |
| $RE_2O_3$ | 8–9.5 |
| $R_2O$ | 16–18.5 |

20. A glass-ceramic body having a dielectric constant (R.T., 0.5 MHz) of at least 40 and a dissipation factor of less than 2 percent, said glass-ceramic prepared by thermally in situ crystallizing a thermally crystallizable glass consisting essentially of the following ingredients in mole percent:

| Ingredient | Mole Percent |
| --- | --- |
| $P_2O_5$ | 20–40 |
| $Nb_2O_5$ | 38–50 |
| $RE_2O_3$ | 7–10 |
| $R_2O$ | 15–20 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R_2O$ is an alkali metal oxide or mixtures of alkali metal oxide.

21. The glass-ceramic body of claim 20 wherein said thermally crystallizable glass consists essentially of the following ingredients in mole percent:

| Ingredient | Mole Percent |
| --- | --- |
| $P_2O_5$ | 27–34 |
| $Nb_2O_5$ | 41–46 |
| $RE_2O_3$ | 8–9.5 |
| $R_2O$ | 16–18.5 |

22. The glass-ceramic body as defined in claim 20 wherein said glass-ceramic is transparent and has an index of refraction of at least 1.90.

23. The glass-ceramic body as defined in claim 20 wherein said glass-ceramic is transparent and has an index of refraction of at least 2.00.

24. The glass-ceramic body as defined in claim 20 wherein said body has a dielectric constant of at least 65 (R.T., 0.5 MHz) and a dissipation factor of less than 1 percent.

25. A glass-ceramic body prepared by thermally in situ crystallizing a thermally crystallizable glass of the composition $R_2RENb_5O_{15} \cdot x\,P_2O_5$ wherein R is an alkali metal cation, RE is a trivalent metal cation selected from the group consisting of La, Nd, Sm, Eu, Gd, Tb, Dy, Ho, Er, Tm, Yb, Sc, Y, In and Bi and x is a number of from 1 to 2.5, said glass ceramic body having a crystal structure selected from the group consisting of cubic perovskite crystal structure and tetragonal tungsten-bronze crystal structure.

26. A thermally crystallizable glass having an index of refraction of at least 2.00 and low acoustical attenuation properties, said glass consisting essentially of the following ingredients in mole percent:

| Ingredient | Mole Percent |
| --- | --- |
| $GeO_2$ | 30–47 |
| $Nb_2O_5$ | 32–43 |
| $RE_2O_3$ | 6.5–8.5 |
| $R^1O$ | 13–22 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R^1O$ is a divalent metal oxide selected from the group consisting of PbO, BaO and SrO and mixtures thereof.

27. The thermally crystallizable glass as defined in claim 26 wherein up to about one-half of said $R_1O$ is replaced by an equal mole percent of an alkali metal oxide.

28. A thermally crystallizable glass having an index of refraction of at least 2.00 and low acoustical attenuation properties, said glass consisting essentially of the following ingredients in mole percent:

| Ingredient | Mole Percent |
| --- | --- |
| $GeO_2$ | 33–44 |
| $Nb_2O_5$ | 35–42 |
| $RE_2O_3$ | 7–8.5 |
| $R^1O$ | 14–17 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R^1O$ is a member selected from the group consisting of PbO, SrO and BaO and mixtures thereof.

29. A transparent glass-ceramic body having a high index of refraction and low acoustical attenuation properties, said glass ceramic formed by thermal in situ crystallization of a thermally crystallizable glass consisting essentially of the following ingredients in mole percent:

| Ingredient | Mole Percent |
| --- | --- |
| $GeO_2$ | 30–47 |
| $Nb_2O_5$ | 32–43 |
| $RE_2O_3$ | 6.5–8.5 |
| $R^1O$ | 13–22 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R^1O$ is a divalent metal oxide selected from the group consisting of PbO, BaO and SrO and mixtures thereof.

30. The transparent glass-ceramic body as defined in claim 29 wherein up to about one-half of said $R^1O$ is replaced by an equal mole percent of an alkali metal oxide.

31. A transparent glass-ceramic body having a high index of refraction and low acoustical attenuation properties, said glass-ceramic formed by thermal in situ crystallization of a thermally crystallizable glass consisting essentially of the following ingredients in mole percent:

| Ingredient | Mole Percent |
|---|---|
| $GeO_2$ | 33–44 |
| $Nb_2O_5$ | 35–42 |
| $RE_2O_3$ | 7–8.5 |
| $R^1O$ | 14–17 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R^1O$ is a member selected from the group consisting of PbO, BaO, SrO and mixtures thereof.

32. A transparent glass-ceramic body having a high index of refraction and low acoustical attenuation properties, said glass ceramic formed by thermal in situ crystallization of a thermally crystallizable glass consisting essentially of the following ingredients in mole percent:

| Ingredients | Mole Percent |
|---|---|
| $GeO_2$ | 30–47 |
| $Nb_2O_5$ | 32–43 |
| $La_2O_3$ | 6.5–8.5 |
| PbO | 13–22 |

33. A glass-ceramic body prepared by thermally in situ crystallizing a thermally crystallizable glass of the composition $R^1RENb_5O_{15} \cdot x\ GeO_2$ wherein $R^1$ is a divalent metal cation selected from $Sr^{+2}$, $Ba^{+2}$ and $Pb^{+2}$ and mixtures thereof, RE is a trivalent metal cation selected from the group consisting of La, Nd, Sm, Eu, Gd, Tb, Dy, Ho, Er, Tm, Yb, Sc, Y, In and Bi ane x is a number from 1.8 to 3.7, said glass-ceramic body having a crystal structure selected from the group consisting of cubic perovskite crystal structure and tetragonal tungsten-bronze crystal structure.

34. A glass-ceramic body formed by thermal in situ crystallization of a thermally crystallizable glass consisting essentially of the following ingredients in mole percent:

| Ingredient | Mole Percent |
|---|---|
| $GeO_2$ | 30–47 |
| $Nb_2O_5$ | 32–43 |
| $RE_2O_3$ | 6.5–8.5 |
| $R^1O$ | 13–22 | wherein $RE_2O_3$ is a trivalent metal oxide selected from the group consisting of oxides of La, Nd, Sm, Eu, Gd, Tb, Dy, Ho, Er, Tm, Yb, Sc, Y, In and Bi and $R^1O$ is a divalent metal oxide selected from SrO, BaO and PbO and mixtures thereof, said body having a dielectric constant (R.T., 0.5 MHz) greater than 100 and a dissipation factor of less than 3 percent.

35. The glass-ceramic body of claim 34 wherein said body has a dielectric constant R.T., 0.5 MHz) greater than 200 and a dissipation factor of less than 3 percent.

36. The glass-ceramic body of claim 34 wherein said dissipation factor is less than 1 percent.

37. Glasses thermally crystallizable to transparent glass-ceramics consisting essentially of the following ingredients:

| Ingredients | Mole Percent |
|---|---|
| $GeO_2$ | 30–45 |
| $Nb_2O_5$ | 32–43 |
| $La_2O_3$ | 6.5–8.5 |
| PbO | 13–22 | wherein up to one-half of the PbO can be replaced by an equal number of moles of BaO, or SrO or both, and wherein up to two-thirds of the PbO can be replaced by an equal number of moles of $Li_2O$, $Na_2O$ or $K_2O$ or mixtures thereof.

38. A transparent glass ceramic made by thermal crystallization of a glass of claim 37.

* * * * *

PO-1050
(5/69)

UNITED STATES PATENT OFFICE
CERTIFICATE OF CORRECTION

Patent No. 3,785,834        Dated January 15, 1974

Inventor(s) James Erich Rapp

It is certified that error appears in the above-identified patent and that said Letters Patent are hereby corrected as shown below:

Column 2, line 54, "$_5O_{15}$ x $SiO_2$" should be --$_5O_{15} \cdot$ x $SiO_2$--
Column 13, Composition 31, line Samarium Oxide, delete "28.6";
Column 13, Composition 32, line Samarium Oxide, insert
-- 28.6 --. Table V, Column 19, under Properties, second
occurrence, line 5, "A.(db/cm)" should be --$A_S$(db/cm)--.
Claim 9, first line under Mole percent, "10-50" should be
-- 20-50 --. Claim 27, second line, "$R_1O$" should be --$R^1O$--.

Signed and sealed this 29th day of October 1974.

(SEAL)
Attest:

McCOY M. GIBSON JR.                C. MARSHALL DANN
Attesting Officer                  Commissioner of Patents